US010490874B2

(12) United States Patent
Smith, Jr. et al.

(10) Patent No.: US 10,490,874 B2
(45) Date of Patent: Nov. 26, 2019

(54) BOARD TO BOARD CONTACTLESS INTERCONNECT SYSTEM USING WAVEGUIDE SECTIONS CONNECTED BY CONDUCTIVE GASKETS

(71) Applicant: TE CONNECTIVITY CORPORATION, Berwyn, PA (US)

(72) Inventors: Graham Harry Smith, Jr., Mechanicsburg, PA (US); Stephen T. Morley, Manheim, PA (US); Hung Thai Nguyen, Harrisburg, PA (US); Michael Frank Cina, Elizabethtown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 132 days.

(21) Appl. No.: 15/459,783

(22) Filed: Mar. 15, 2017

(65) Prior Publication Data

US 2017/0271738 A1    Sep. 21, 2017

Related U.S. Application Data

(60) Provisional application No. 62/310,274, filed on Mar. 18, 2016.

(51) Int. Cl.
*H01P 5/08* (2006.01)
*H04W 4/80* (2018.01)
(Continued)

(52) U.S. Cl.
CPC ............ *H01P 5/08* (2013.01); *H01P 1/02* (2013.01); *H01P 1/042* (2013.01); *H01P 3/08* (2013.01);
(Continued)

(58) Field of Classification Search
CPC .......... H01P 5/107; H01P 5/082; H01P 5/024; H01P 1/042; H01P 1/02; H01P 1/022; H01P 1/025; H01P 1/027; H01P 3/12
(Continued)

(56) References Cited

U.S. PATENT DOCUMENTS

| | | | | |
|---|---|---|---|---|
| 2,829,348 A | * | 4/1958 | Kostriza et al. | H01P 5/107 333/238 |
| 4,716,386 A | * | 12/1987 | Lait | H01P 5/107 333/248 |
| 4,734,140 A | * | 3/1988 | Tzeng | H05K 9/0015 148/513 |
| 5,629,657 A | | 5/1997 | Bayorgeon et al. | |

(Continued)

FOREIGN PATENT DOCUMENTS

FR    2 869 723 A1    11/2005

OTHER PUBLICATIONS

International Search Report, International Application No. PCT/2017/051577, dated Mar. 17, 2017.

*Primary Examiner* — Benny T Lee

(57) ABSTRACT

A board to board contactless interconnect system includes a first circuit board for launching at st one microwave signal into a cavity of a first waveguide secured thereto. A second waveguide, secured to a second circuit board, is coupleable to the first waveguide to receive the at least one microwave signal in a cavity of the second waveguide and conduct the at least one microwave signal onto a microwave receiver aligned with the cavity on the second circuit board. The waveguides may be separable and may include additional waveguides. Conductive gaskets with apertures for microwave signals to pass through are positioned between the waveguides and between each circuit board and a waveguide to prevent leakage of microwave energy therebetween. Some embodiments may pass signals through a sealed boundary and maintain integrity of the seal. Such embodiments may have a third waveguide interposed between the first and second waveguides.

12 Claims, 8 Drawing Sheets

(51) Int. Cl.

| | |
|---|---|
| *H01P 1/04* | (2006.01) |
| *H01P 1/02* | (2006.01) |
| *H01P 3/12* | (2006.01) |
| *H01P 3/08* | (2006.01) |
| *H01Q 13/02* | (2006.01) |
| *H01P 5/02* | (2006.01) |
| *H01P 5/107* | (2006.01) |

(52) U.S. Cl.
CPC ............... *H01P 3/12* (2013.01); *H01P 5/024* (2013.01); *H01P 5/107* (2013.01); *H01Q 13/0266* (2013.01); *H04W 4/80* (2018.02)

(58) Field of Classification Search
USPC .................................. 333/26, 254, 248, 249
See application file for complete search history.

(56) References Cited

U.S. PATENT DOCUMENTS

| | | | |
|---|---|---|---|
| 7,680,464 B2 * | 3/2010 | Pleva et al. ............. | H01P 5/107 333/208 |
| 2004/0227597 A1 | 11/2004 | Chang et al. | |
| 2006/0097819 A1 * | 5/2006 | Lo Hine Tong et al. .................... | H01P 5/107 333/26 |
| 2011/0037530 A1 * | 2/2011 | Mangalahgari et al. ..................... | H01P 5/107 333/26 |
| 2012/0033931 A1 * | 2/2012 | Usui et al. ............ | H01P 11/002 385/141 |
| 2013/0183902 A1 | 7/2013 | McCarthy et al. | |
| 2015/0270595 A1 * | 9/2015 | Okada ..................... | H04B 1/40 333/254 |

\* cited by examiner

| Transmit | Receive |
|---|---|
| Integrated Circuit | Board Pad |
| Integrated Circuit | Integrated Circuit |
| Board Pad | Board Pad |
| Board Pad | Integrated Circuit |

BOARD TO BOARD CONTACTLESS INTERCONNECT SYSTEM USING WAVEGUIDE SECTIONS CONNECTED BY CONDUCTIVE GASKETS

CROSS REFERENCE TO RELATED APPLICATIONS

This application claims priority from and the benefit of U.S. Provisional Patent Application No. 62/310,274, entitled IMPLEMENTATION OF A WAVEGUIDE STYLE CONTACTLESS CONNECTOR, filed Mar. 18, 2016, which is hereby incorporated by reference.

FIELD OF THE INVENTION

The present invention is directed to a board to board contactless interconnect system. The application relates more specifically to a system including two circuit boards and a microwave waveguide extending between the two circuit boards.

BACKGROUND OF THE INVENTION

Board to board interconnections employing a multi-contact connector having contacts terminated on each mating has been a long standing concern for contact wear of the mating regions of the contacts. Connectors designed for some environments must meet stringent requirements for contact wear. Harsh environments encountered in applications subjected to vibrations exacerbate concern for integrity of the electrical connections.

What is needed is a reliable board to board interconnect system that eliminates constant contact wear from repeated connect-disconnect cycles. By eliminating the contacts, mating surfaces that wear are eliminated as are concerns that vibration could separate worn contacts.

SUMMARY OF THE INVENTION

An embodiment is directed to a board to board contactless interconnect system includes a first circuit board having a transceiver for launching or receiving a microwave signal into or from a cavity extending through a first waveguide. The first waveguide has a first end securable to the first circuit board with the transceiver and first waveguide cavity aligned. A first conductive gasket is positioned between the first circuit board and the first end of the first waveguide. The first conductive gasket has an aperture aligned with the first waveguide cavity. The aperture has a cross-sectional shape and dimensions of a cross-section of the first waveguide cavity. A second waveguide has a first end coupleable to a second end of the first waveguide. The second waveguide has a second waveguide cavity with the same cross-sectional shape and dimensions of the cross-section of the first waveguide cavity for receiving or passing the microwave signal. A second conductive gasket is positioned between the second end of the first waveguide and the first end of the second waveguide. The second conductive gasket has an aperture aligned with the first waveguide cavity and the second waveguide cavity. The aperture has the cross-sectional shape and dimensions of the cross-section of the second waveguide cavity. A second circuit board has a transceiver for receiving or launching the microwave signal from or into the second waveguide cavity. The second end of the second waveguide is securable to the second circuit board with the transceiver and the second waveguide cavity aligned. A third conductive gasket is positioned between the second end of the second waveguide and the second circuit board. The third conductive gasket has an aperture aligned with the second waveguide cavity. The aperture has the cross-sectional shape and dimensions of the cross-section of the second waveguide cavity.

Some embodiments of the invention may be used to conduct signals across a sealed boundary barrier from an electrically noiseless environment to an electrically noisy environment while maintaining the integrity of the sealed boundary barrier. A third waveguide is interposed between the first waveguide and the second waveguide. The third waveguide has a third waveguide cavity with the same cross-sectional shape and dimensions of the cross-section of the first waveguide cavity and the second waveguide cavity. The third waveguide cavity receives and passes the microwave signal between first and second ends of the third waveguide. The first end of the third waveguide is couplable to the second end of the first waveguide with the second conductive gasket therebetween. The third waveguide is securable to a first side of a sealed boundary barrier. The third waveguide has a flange passing through an aperture in the sealed boundary barrier. The second end of the third waveguide member is couplable with the first end of the second waveguide, with the third waveguide cavity and the second waveguide cavity aligned. A fourth conductive gasket positioned between the third waveguide and the first side of the sealed boundary barrier. The fourth conductive gasket has an aperture therein surrounding the aperture in the sealed boundary barrier through which the third waveguide flange passes to prevent microwave energy leakage therebetween. A fifth conductive gasket is positioned between the second end of the third waveguide and the first end of the second waveguide. The fifth gasket has an aperture aligned with the third waveguide cavity and the second waveguide cavity. The aperture has the cross-sectional shape and dimensions of the cross-section of the second waveguide cavity.

An embodiment of a stripline—waveguide transition is directed to a conductive transmission line arranged and disposed between first and second ground planes. The conductive transmission line is dielectrically isolated from first and second ground planes by dielectric. An antenna extends into an opening in the first ground plane. The antenna is coupled to the conductive transmission line. The antenna is a radiating/receiving element antenna of a fixed length and width and includes an arc of wire extending from a first corner of the end of antenna to a second corner of the end of the antenna. The arc of wire extends beyond a profile of sides forming the width of the antenna. A step in the width of the conductive stripline increases an impedance of the stripline to more closely match an impedance of the antenna. A waveguide having a waveguide cavity is arranged and disposed substantially perpendicular with the conductive stripline antenna. The waveguide cavity is aligned with the opening in the first ground plane. The radio frequency energy transitions between a TEM mode propagation in the stripline and a TE mode propagation in the waveguide as a transmitter, and the radio frequency energy transitions between a TE mode propagation in the waveguide and a TEM mode propagation in the stripline as a receiver.

Other features and advantages of the present invention will be apparent from the following more detailed description of the invention, taken in conjunction with the accompanying drawings which illustrate, by way of example, the principles of the invention.

DETAILED DESCRIPTION OF THE INVENTION

Figure 1:
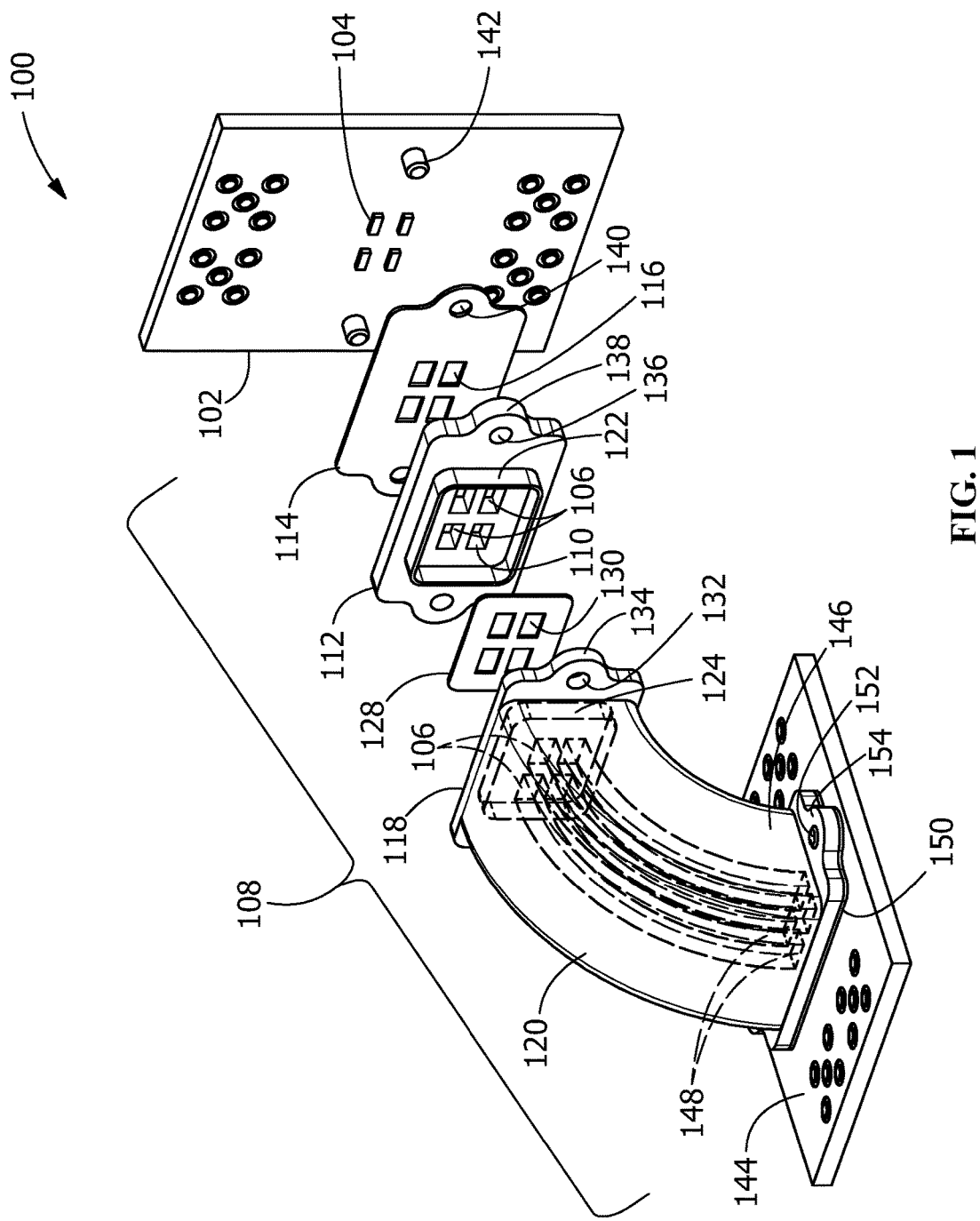
FIG. 1 is an exploded isometric view of a board to board contactless interconnect which transmits from pads on a first circuit board to pads on an orthogonally oriented second circuit board.

FIG. 1 is an exploded isometric view of an embodiment of a board to board contactless interconnect system 100. A first circuit board 102 has one or more circuit board pads 104 for launching respective microwave signals from first circuit board 102. The signals may be generated on first circuit board 102. A microwave signal can be launched from each board pad 104 into a respective cavity 106 of waveguide 108. Board pads 104 can be used as a transmitter or as a receiver in the waveguide applications disclosed herein. Waveguides are structures for guiding waves through a cavity or cavities therein. In some embodiments, waveguides are used to guide electromagnetic waves away from a transmitter, toward a receiver, between a transmitter and a receiver, through mixers, separators, and attenuators. Waveguides for guiding electromagnetic waves are typically fabricated of a conductive material which inherently has cavities with conductive inner surfaces 110. Waveguides can be fabricated of nonconductive material provided the inner surfaces of cavities are coated or plated with an electrically conductive material, including but not limited to aluminum or copper. Typical conductive materials used to fabricate waveguides for electromagnetic waves are aluminum, copper and brass. Typical nonconductive material used to fabricate waveguides for electromagnetic waves is plastic. Waveguides enable a signal to propagate efficiently with minimal loss of energy.

Board to board contactless interconnect system 100 includes a first circuit board 102 with launching pads 104 for launching microwave signals into a first portion 112 of waveguide 108. Waveguide 108 may be fabricated in two or more pieces to facilitate separation and/or removing one of the circuit boards for repair, testing or replacement. The first portion 112 is mountable on and securable to first circuit board 102, with a first conductive gasket 114 be positioned between the first circuit board 102 and the first portion 112 of waveguide 108. Gasket 114, and other gaskets described herein are conductive gaskets and may be, a compressible material, a metal gasket, a metal filled material, or a conductive metallic material. First conductive gasket 114 has apertures 116 corresponding in number, size and shape with the pads 104 and are aligned with respective pads 104 between the first portion 112 of waveguide 108 and first circuit board 102. First conductive gasket 114 prevents microwave energy leakage between the first portion 112 of waveguide 108 and first circuit board 102.

The first portion 112 of waveguide 108 is engagable with and securable to a first end 118 of a second portion 120 of waveguide 108. One of the first portion 112 or the second portion 120 has an extension for insertion units or reception by the other. In FIG. 1, first portion 112 is illustrated as having an extension 122. Extension 122 is received in a corresponding recess 124 in the first end 118 of second portion 120 of waveguide 108. The cavities 106 in the second portion 120 of waveguide 108 correspond in number, size and shape with the cavities in first portion 112 of waveguide 108, and are aligned with cavities 106.

A second gasket 128 has apertures 130 corresponding in number, size and shape with, and in alignment with, the cavities 106 in both first portion 112 and second portion 120 of waveguide 108. Conductive gasket 128 is received in recess 124, is compressible and prevents microwave energy leakage between first portion 112 of waveguide 108 and the second portion 120 of waveguide 108.

The second portion 120 of waveguide 108 forms an arc of a predetermined number of degrees, for example a 90° arc. Cavities 106 within the second portion 120 of waveguide 108 are arcuate cavities that also form an arc of the predetermined number of degrees.

With second conductive gasket 128 and extension 122 received in recess 124, securing devices such as bolts are passed through apertures 132 in flange 134 of first end 118, apertures 136 in flange 138 of first portion 112 and apertures 140 in first conductive gasket 114 to engage complementary securing devices 142 on first circuit board 102 to compress gaskets 114 and 128 and secure waveguide 108 to the first circuit board.

The second portion 120 of waveguide 108 is mountable on and securable to a second circuit board 144 in a manner similar to first portion 112 of waveguide 108 being secured to the first circuit board 102. Securing devices 152 pass through apertures in flange 154 to engage in complementary structures secured to second circuit board 144. The cavities 106 at a second end 146 of second portion 120 are aligned with board pad receivers 148 on the second circuit board 144 to receive microwave signals transmitted from corresponding board pad transmitters 104 on the first circuit board 102. Board pad transmitters and receivers are identical and can be used as a receiver when receiving a microwave signal or as a transmitter when launching a microwave signal in the waveguide applications disclosed herein.

A third conductive gasket 150 having apertures corresponding in number, size and shape, and in alignment with the cavities 106 in the second portion 120 of waveguide 108 is positioned between the second end 146 of the second portion of waveguide 108 and second circuit board 144. Conductive gasket 150 prevents microwave energy leakage between the second end 146 of the second portion 120 of waveguide 108 and second circuit board 144. Conductive gasket 150 may be identical to first conductive gasket 114.

As shown in FIG. 1, in some embodiments of the invention, first and second circuit boards 102, 144 are orthogonal to each other. The angle formed by the first and second circuit boards is determined in the embodiment in FIG. 1 by the predetermined number of degrees formed in the arc of second portion 120 of waveguide 108 and cavities 106. An arc of 90° results in the first and second circuit boards 102, 144 being perpendicular to each other.

Data is transmitted from one circuit board to the other, such as from first circuit board 102 to second circuit board 144, or from second circuit board 144 to first circuit board 102, by modulating a carrier frequency within the bandwidth that can be transmitted in a waveguide. Any known modulating technique may be used, including, but not limited to, amplitude shift keying (ASK), phase shift keying (PSK), frequency shift keying (FSK), quadrature amplitude modulation (QAM), and quadrature phase shift keying (QPSK). After being received at the receiving end of the waveguide, the data is removed from the carrier by demodulation with the same technique the data was imposed on the carrier. In waveguides with at least two cavities, data can flow in both directions, albeit in separate cavities. Waveguides provide a low noise, low crosstalk and low energy loss technique to transfer data at high speeds.

Figure 2:
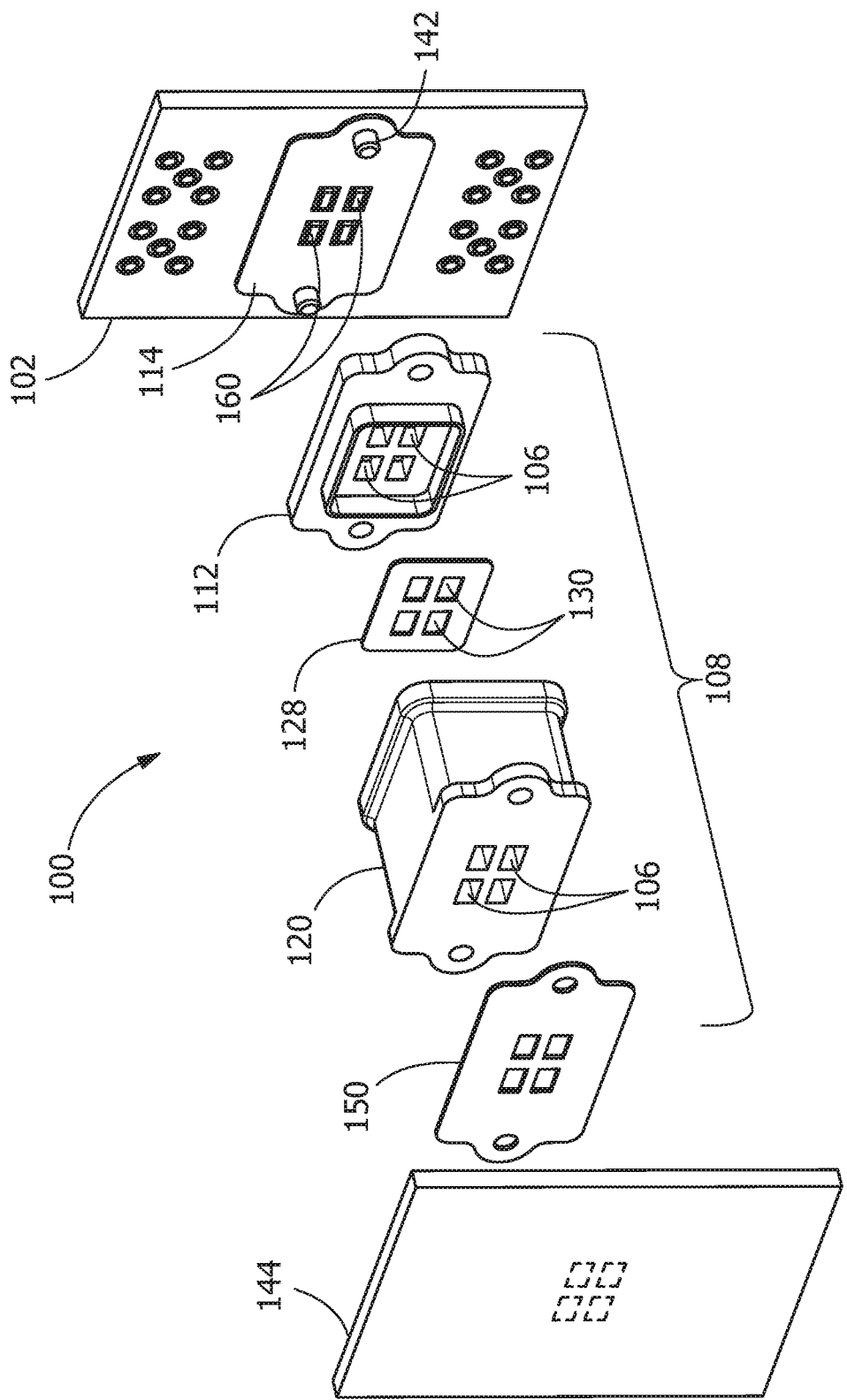
FIG. 2 is an exploded isometric view of a board to board contactless interconnect which transmits from an integrated circuit on a first circuit board to pads on a parallel oriented second integrated circuit.

FIG. 2 is an exploded isometric view of an alternate embodiment board to board contactless interconnect system 100. Instead of having board pads 104 to launch microwave signals, as in the embodiment of FIG. 1, microwave signals are launched from integrated circuits 160 on first circuit board 102. Transmitted microwave signals pass through cavities 106 in first portion 112 and second portion 120 of waveguide 108. The second portion of waveguide 108 has straight cavities to accommodate a board to board contactless interconnect system where first circuit board 102 and second board 144 are parallel. The microwave signals are received by respective receivers on the second circuit board 144. The receivers are any known receiver, including but not limited to board pads and integrated circuits. Gaskets 114, 128 and 150 may be present to prevent leakage of microwave energy as described above. As numbered features in FIG. 2 perform the same function as the numbered features in FIG. 1, the description of the numbered features are incorporated by reference.

Figures 3, 4:
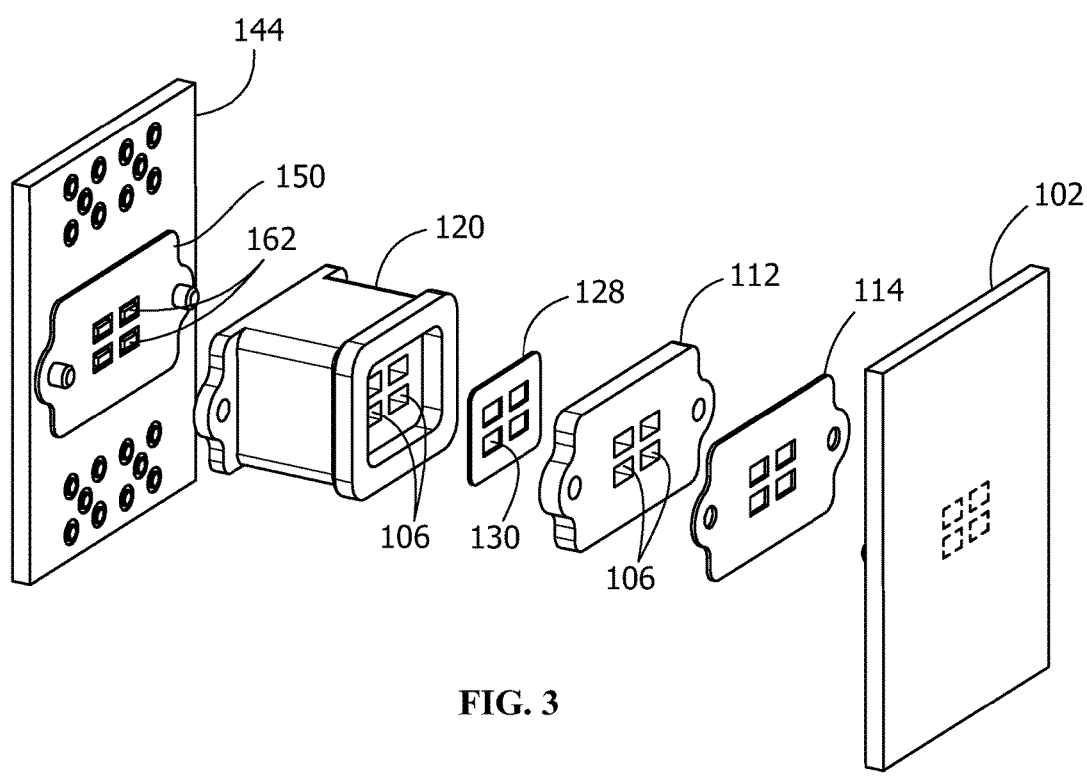
FIG. 3 is an exploded isometric view of a board to board contactless interconnect which transmits from pads on a first circuit board to an integrated circuit on a parallel oriented second integrated circuit.
FIG. 4 is a table of the possible combinations of bond pad and integrated circuit transmitters and bond pad and integrated circuit receivers on two circuit boards.

FIG. 3 is an exploded isometric view of another alternate embodiment board to board contactless interconnect system 100. First and second circuit boards 102, 144 may be parallel mounted. In this embodiment the microwave signals are launched from first circuit board 102 by any known transmitter, including but not limited to board pads and integrated circuits, and the microwave signals are received by respective receivers 162 on second circuit board 144 that are integrated circuits. Cavities 106 have a predetermined cross section through the length of each illustrated waveguide. Cavities have been illustrated as having a rectangular cross-section, however, cavities are not limited to having a rectangular cross-section. As the numbered features in FIG. 3 perform the same function as the same numbered features in FIGS. 1 and 2, the description of the numbered features are incorporated herein by reference.

Figure 5:
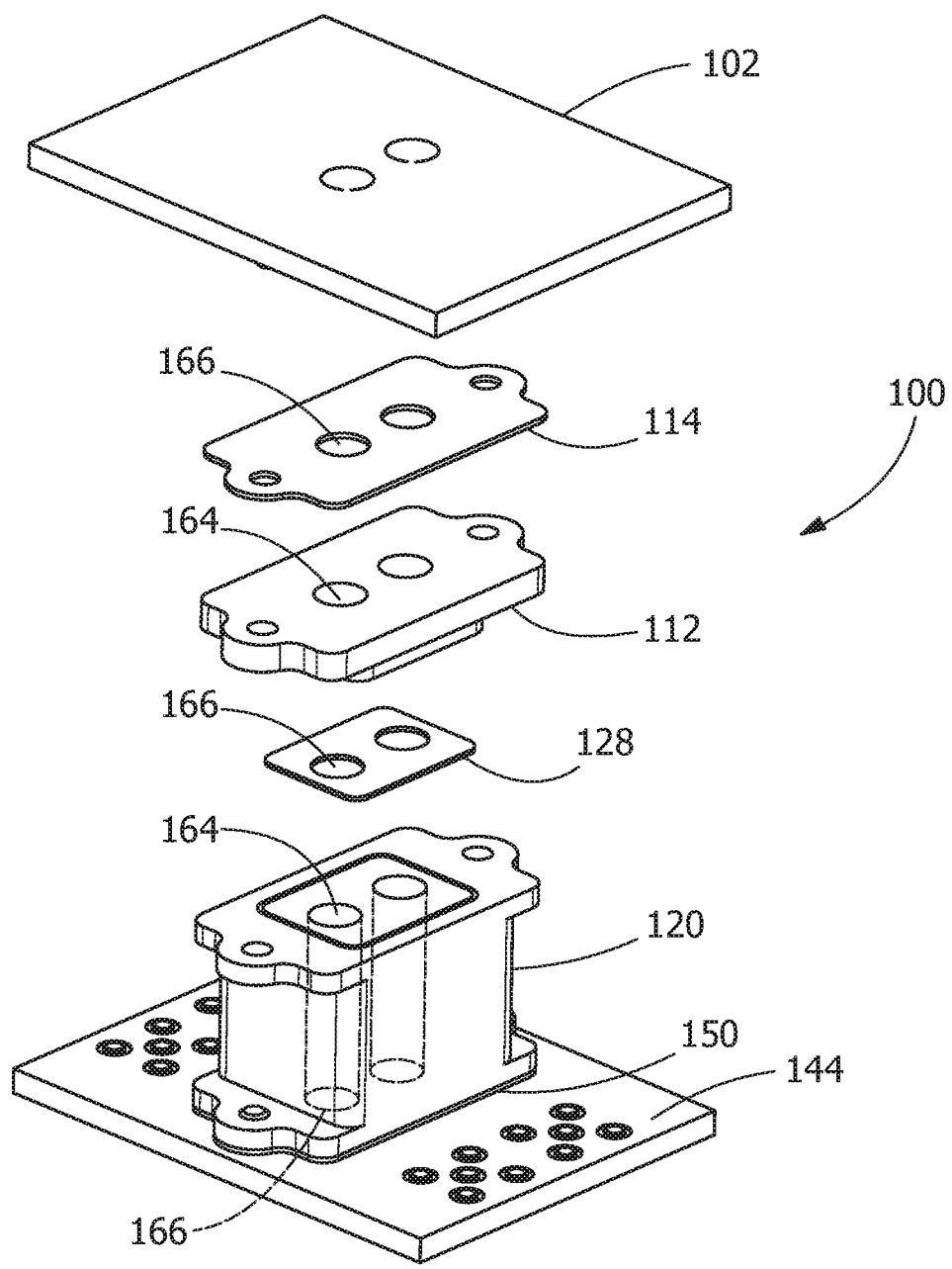
FIG. 5 is an exploded isometric view of a board to board contactless interconnect which transmits between two parallel circuit boards using a waveguide having circular cavities.

FIG. 5 is an exploded isometric view of yet another alternate embodiment board to board contactless interconnect system 100. In some embodiments, the first and second waveguide portions 112, 120 have one or more circular cross section cavities 164. Gaskets 114, 128, and 150, if present, have circular apertures 166 aligned with respective cavities 164. More generally, the gaskets 114, 128, and 150 will have apertures that correspond in number and have the same cross section shape and cross section dimensions as cavities in the waveguide portions 112 and 120. The transmitters and receivers can be any known transmitters or receivers, such as integrated circuits and bond pads in any combination. FIG. 4 identifies a subset of combinations of transmitters and receivers, however, the invention is not limited to the subset of combinations illustrated in FIG. 4. As the numbered features in FIG. 5 perform the same function as the same numbered features in FIGS. 1 and 2, the description of the numbered features are incorporated herein by reference.

Figure 6:
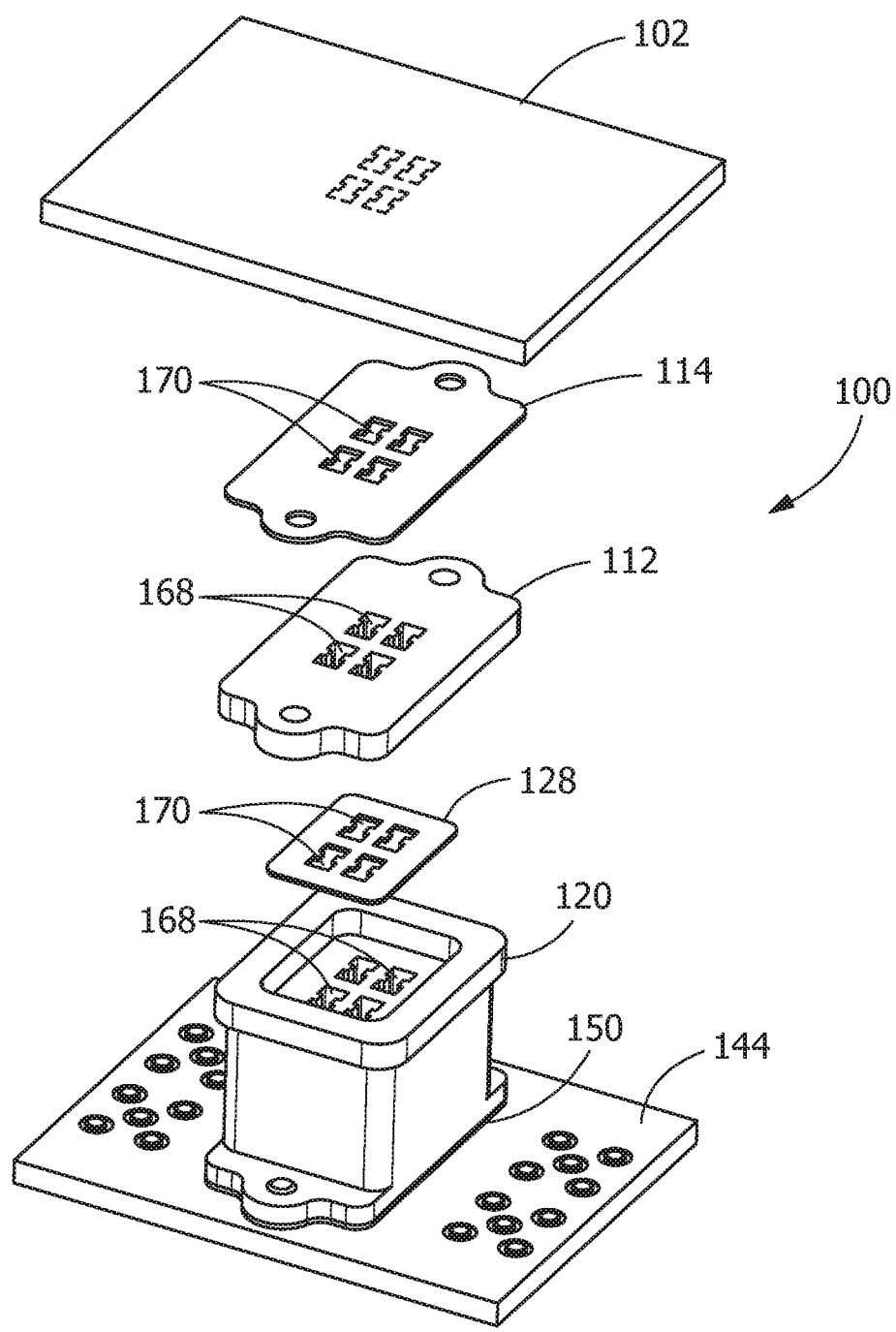
FIG. 6 is an exploded isometric view of a board to board contactless interconnect which transmits between two parallel circuit boards using a waveguide having a double ridge cavities.

FIG. 6 is an exploded isometric view of yet another alternate embodiment board to board contactless interconnect system 100. In some embodiments, the first and second waveguide portions 112, 120 have one or more cavities 168 with a cross section in the shape of a double ridge 170 waveguide. A double ridge waveguide provides a broader range of frequencies for the carrier. The cut-off frequency is lower and the moding point is higher, thus providing a larger range of frequencies between the cut-off frequency and the moding point. Gaskets 114, 128 and 150, if present, have apertures that correspond in number and have the same cross section double ridge shape 170 and cross section dimensions as cavities 168 in the waveguide portions 112 and 120, and are aligned with the double ridge cavities 168. The transmitters and receivers can be any known transmitters or receivers, such as integrated circuits and bond pads. FIG. 4 identifies a few combinations of transmitters and receivers. As the numbered features in FIG. 6 perform the same function as the same numbered features in FIGS. 1 and 2, the description of the numbered features are incorporated herein by reference.

Figure 7:
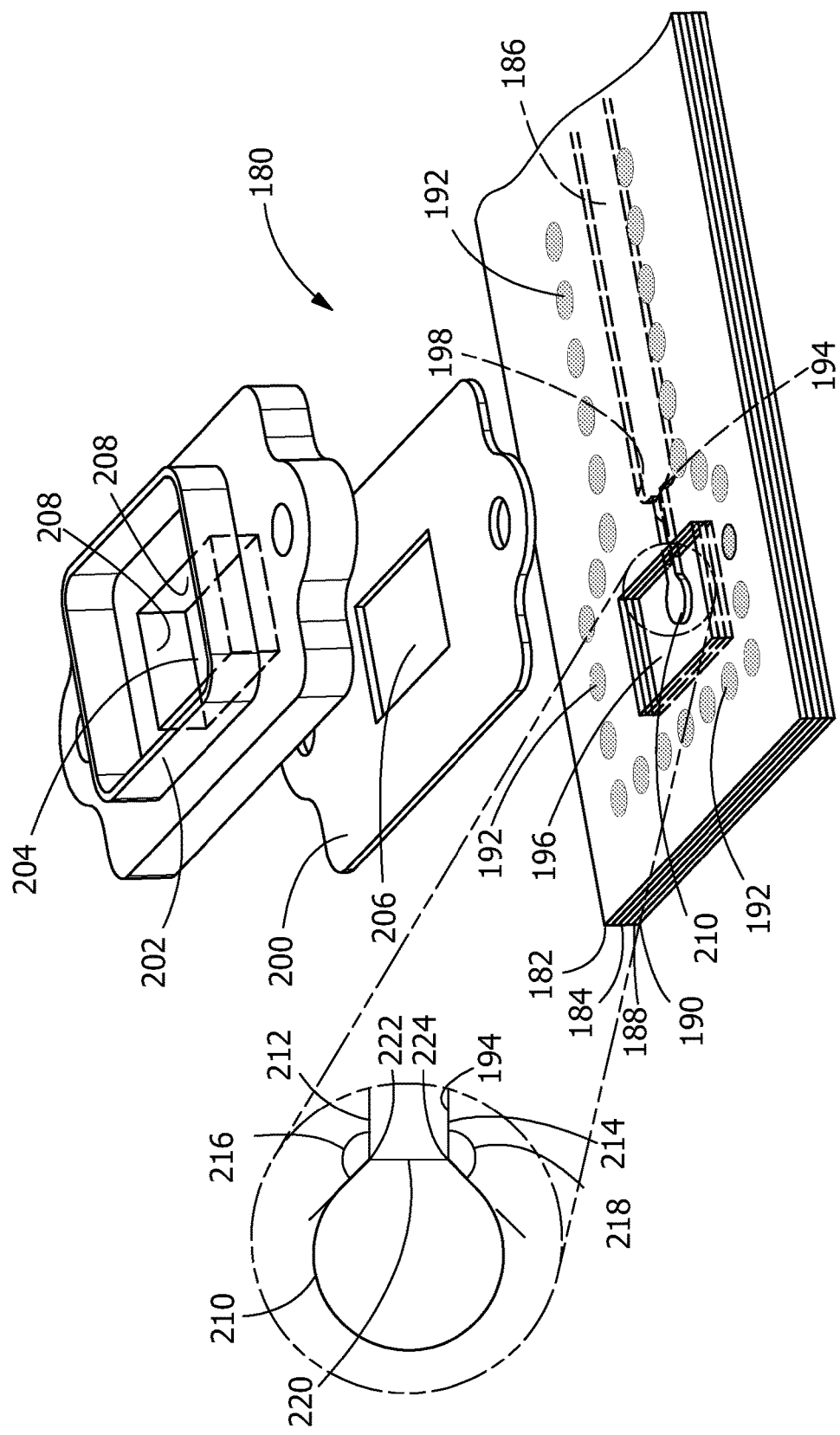
FIG. 7 is a perspective view of a stripline—waveguide transition in accordance with an embodiment of the invention.

FIG. 7 is a partial see through perspective view of a Stripline—waveguide transition 180 in accordance with an embodiment of the invention. Stripline—waveguide transition 180 is a transceiver that can be used as a receiver or as a transmitter in the waveguide applications disclosed herein. Stripline—waveguide transition 180 is described here as a transmitter. One skilled in the art knows the transition 180 will also operate in the opposite signal direction as a receiver. Transition 180 is comprised of an upper ground plane 182, an upper dielectric layer 184, a transmission line 186, a lower dielectric layer 188 and a lower ground plane 190. While two dielectric layers 184 and 188 will be described, it is understood that a single layer of dielectric with the transmission line 186 embedded therein will suffice. Transmission line 186 is isolated from the upper and lower ground planes 182 and 190 by respective dielectric layers 184 and 188. The upper and lower ground planes 182 and 190 are electrically coupled by electrically conductive interconnects 192 which are positioned along the sides of transmission line 186, antenna 194 and an opening 196 in upper ground plane 182. Transmission line 186 narrows by a step change in width at transition point 198 forming antenna 194 which extends into opening 196. Antenna 194 has a higher impedance than the transmission line or stripline feed and the transition point introduces a stepped high impedance discontinuity for better impedance matching. Gasket 200 is positioned on the upper ground plane 182, engages multiple electrically conductive interconnects 192, and forms a common ground with the upper and lower ground planes 182, 190. Waveguide 202 is positioned on gasket 200 and secured to stripline—waveguide transition 180 and prevents microwave energy leakage between waveguide 202 and upper ground plane 182. The cross section shape and dimensions of cavity 204 in waveguide 202 are also the cross section shape and dimensions of opening 196 in upper ground plane 182 and aperture 206 in gasket 200. Cavity 204 is illustrated as a rectangular shape although the invention is not limited thereto. The shape could be any known cavity shape and dimensions.

A modulated signal is applied to transmission line 186 and passes transition point 198 onto antenna 194. Stripline—waveguide transition 180, as a transmitter, transitions the radio frequency energy between the TEM mode propagation in transmission line 186 to the TE mode propagation in waveguide 202 launching the modulated microwave signal into waveguide 202. If the waveguide 202 is not fabricated of a conductive material, cavity inner surfaces 208 of waveguide 202 are coated or plated with a conductive material. The waveguide 202 is shown as having a rectangular cross section cavity 204. However the invention is not limited thereto. Stripline—waveguide transition 180 can be used with any known cross section waveguide including but not limited to rectangular, circular and double ridge.

Antenna 194 is a radiating/receiving element antenna of a fixed length and width. As described above, antenna 194 has a higher impedance than the transmission line 186 feed. As seen in FIG. 7 and the enlarged insert, antenna 194 extends into opening 196 terminating in a curved or circular tip 210. In some embodiments, the curved tip may have a symmetrical shape which appears as a flattened circle. The presence of a curved or circular tip 210 modifies the end of antenna 194 extending into opening 196 to tune the antenna to the waveguide 202.

In some embodiments, the curved tip is a circle having a diameter that is larger than the width of antenna 194 from side 212 to side 214. Where the curved tip 210 extends away from side 212, a first obtuse angle 216, having a vertex 222, is formed with side 212. Where the curved tip 210 extends away from side 214, a second obtuse angle 218, having a vertex 224, is formed with side 214. When the curved tip is a circle, a line segment extending between the vertices 222 and 224 forms a chord 220 of circular tip 210. In some embodiments, the center of the circular tip 210 is positioned at the intersection of diagonal lines extending between diagonally opposite corners of the rectangular opening 196 in upper ground plane 182. The center of the circular tip 210 may be positioned at the center of the opening 196 of the ground panel 182.

The curved tip 210 having a shape as described above results in efficient, low loss, good bandwidth transmission of modulated signals. A transmission line 186 feed with electrically conductive interconnects 192 along the transmission line 186, closely spaced relative to the frequency of the microwave frequency, provides excellent electromagnetic interference suppression as well as the ability to constrain electric fields.

Figure 8:
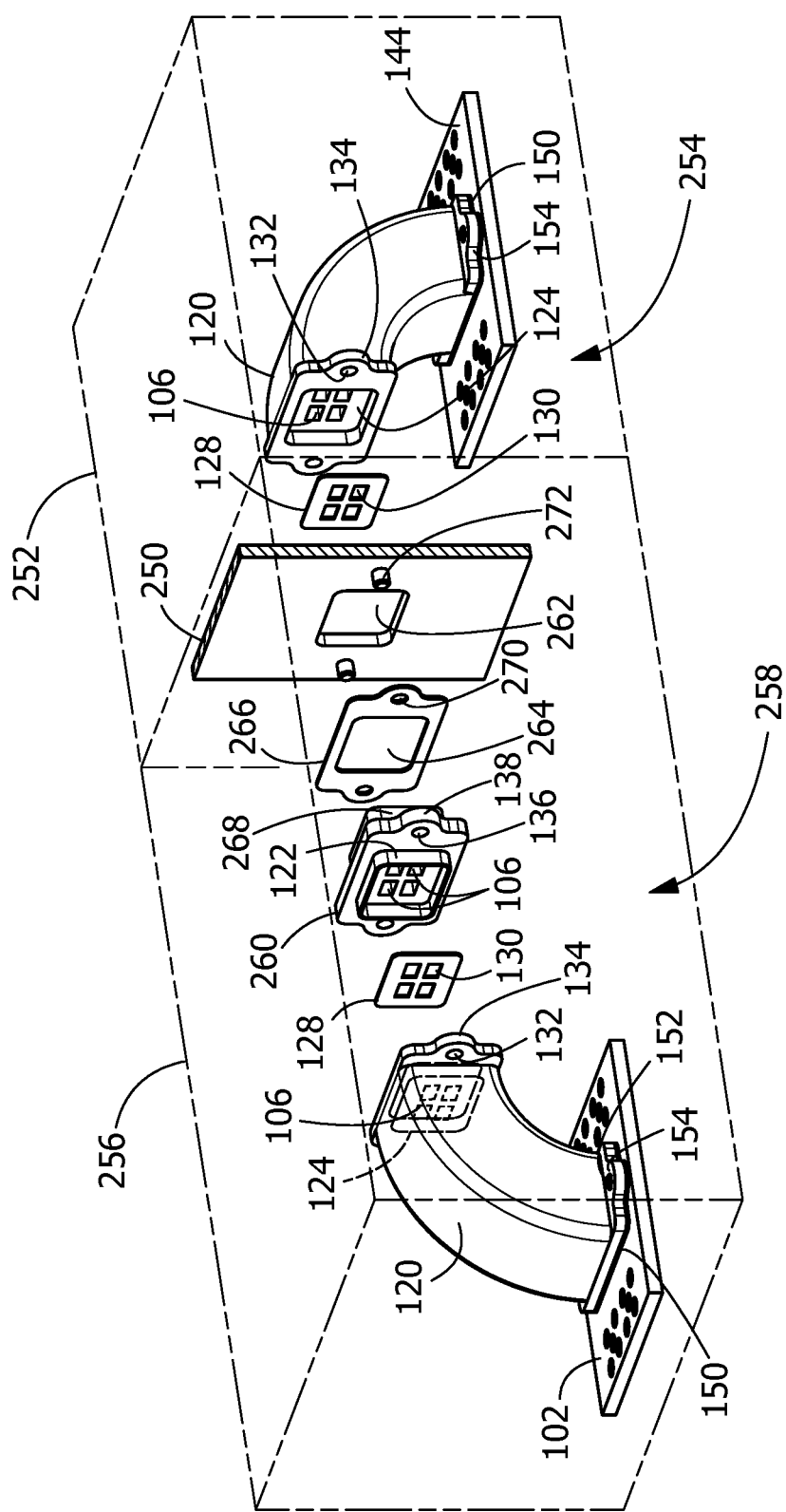
FIG. 8 is an exploded isometric view of a board to board contactless interconnect through a sealed boundary.

FIG. 8 is an exploded isometric view of an alternate embodiment board to board contactless interconnect system. In some embodiments, the board to board contactless interconnect system will pass signals through a sealed boundary 250. Sealed boundary 250 represents a physical, electrically isolating, barrier between an electrically noisy environment and an electrically noise free environment. While the description is presented in terms of two enclosures, it is understood that the description applies equally to a single enclosure having therein an electrically noise free interior and a noisy environment beyond the enclosure. Enclosure 252 illustrated as dashed lines has an interior 254 that is electrically noise free. Enclosure 256 also illustrated as dashed lines has an interior 258 that has an electrically noisy environment. Circuits in enclosure 256 generate undesirable electrical noise or interference, such as electromagnetic interference, that would be detrimental to the circuits that are isolated in enclosure 256 by the sealed boundary 250 from noise electrical or other electrical interference.

As described above, microwave signals with data imposed thereon are transmitted from first circuit board 102 to second board 144, or vice versa, by modulating a carrier within the bandwidth that can be transmitted in waveguide portions 120 and 260. Various elements of the board to board contactless interconnect system are illustrated to be identical to or similar to corresponding elements in other embodiments for convenience and ease of understanding, but are not limited thereto. Aperture 262 in sealed boundary 250 and aperture 264 in sealing gasket 266 are sized to receive flange 268 of waveguide portion 260. Waveguide portion 120 on first circuit board 102 is illustrated as being identical to waveguide portion 120 on second circuit board 144, but is not limited thereto. Waveguide portions 120 are securable to the respective circuit board on which they are mounted with cavities aligned with a transmitter or receiver and a respective conductive gasket 150 with apertures corresponding in number, size and shape between the waveguide portion 120 and the respective circuit board to prevent microwave leakage therebetween.

Within enclosure 256, conductive gasket 128 with apertures 130 corresponding in number, size and shape with cavities 106, is in alignment with the cavities 106 in both waveguide portion 120 and waveguide portion 260. Conductive gasket 128 is received in recess 124 along with extension 122 of waveguide portion 260. Conductive gasket 128 prevents microwave energy leakage between waveguide portions 120 and 260. Flange 268 of waveguide portion 260 passes through aperture 264 in sealing gasket 266 and through aperture 262 in sealed boundary 250. Bolts are passed through apertures 132 in flange 134 of waveguide portion 120, apertures 136 in flange 138, and apertures 270 in sealing gasket 266 to engage complementary securing devices 272 on the enclosure 256 side of sealed boundary 250. With waveguide portion 120 in enclosure 256 secured to sealed boundary 250, sealing gasket 266 is compressed between the sealed boundary 250 and flange 138 of waveguide portion 260 prevents microwave energy leakage therebetween. Waveguide portion 120 in enclosure 256 is similarly secured to first circuit board 102 as described above.

Flange 268 extends through aperture 262 in sealed boundary 250 and beyond sealed boundary 250 into enclosure 252 at a distance corresponding to the depth of recess 124 in the waveguide portion 120 in enclosure 252. Bolts are passed through apertures 132 of waveguide portion 120 in enclosure 252. Within enclosure 252, conductive gasket 128 with apertures 130 corresponding in number, size and shape with, and in alignment with, the cavities 106 in both waveguide portion 120 and waveguide portion 260, is received in recess 124 along with flange 268 of waveguide portion 260 and prevents microwave energy leakage between waveguide portion 120 in enclosure 252 and the flange 268 of waveguide portion 260. The bolts engage complementary securing devices similar to devices 272 on the enclosure 252 side of sealed boundary 250. Sealed boundary 250 is part of enclosure 252 and may simultaneously be a part of enclosure 256. Enclosure 252 is conductive or is coated or plated to be conductive to shield the interior 254 of enclosure 252 from electrical noise, including electromagnetic interference, that is external to enclosure 252.

Data is transmitted from one circuit board to the other, such as first circuit board 102 to second circuit board 144, or from second circuit board 144 to first circuit board 102, by modulating a carrier frequency within the bandwidth that can be transmitted in waveguide portions 120 and 260. Any known modulation technique may be used. After being received at the receiving end of the waveguide, the data is removed from the carrier by demodulation with the same technique used to impress the data on the carrier. Data to be transmitted from first circuit board 102 to second circuit board 144, or from second circuit board 144 to first circuit board 102, can be generated on the respective circuit board from which the data is to be transmitted across sealed boundary 250 or it can be delivered to the circuit board from which the data is to be transmitted such as by a multi-conductor cable and a connector or by a fiber optic cable and connector, or wirelessly, with corresponding circuitry. Similarly, once the data has been transmitted across sealed boundary 250, the data can be utilized on the first circuit board, 102 or 144, on which it is received, or it can be further transmitted such as by a multi-conductor cable and a connector or by a fiber optic cable and connector, or wirelessly, with corresponding circuitry to another circuit board for further processing. First and second circuit boards 102 and 144 in embodiments of a contactless interconnect system capable of passing signals through a sealed boundary 250 may be backplane boards on which multiple daughter cards are mounted.

In some embodiments, the board to board contactless interconnect system has waveguide portions 120 that form an arc with arcuate cavities to accommodate first and second circuit boards 102 and 144 being parallel. In some embodiments the circuit boards, on which waveguide portions 120 form an arc with arcuate cavities, will be coplanar.

Figure 9:
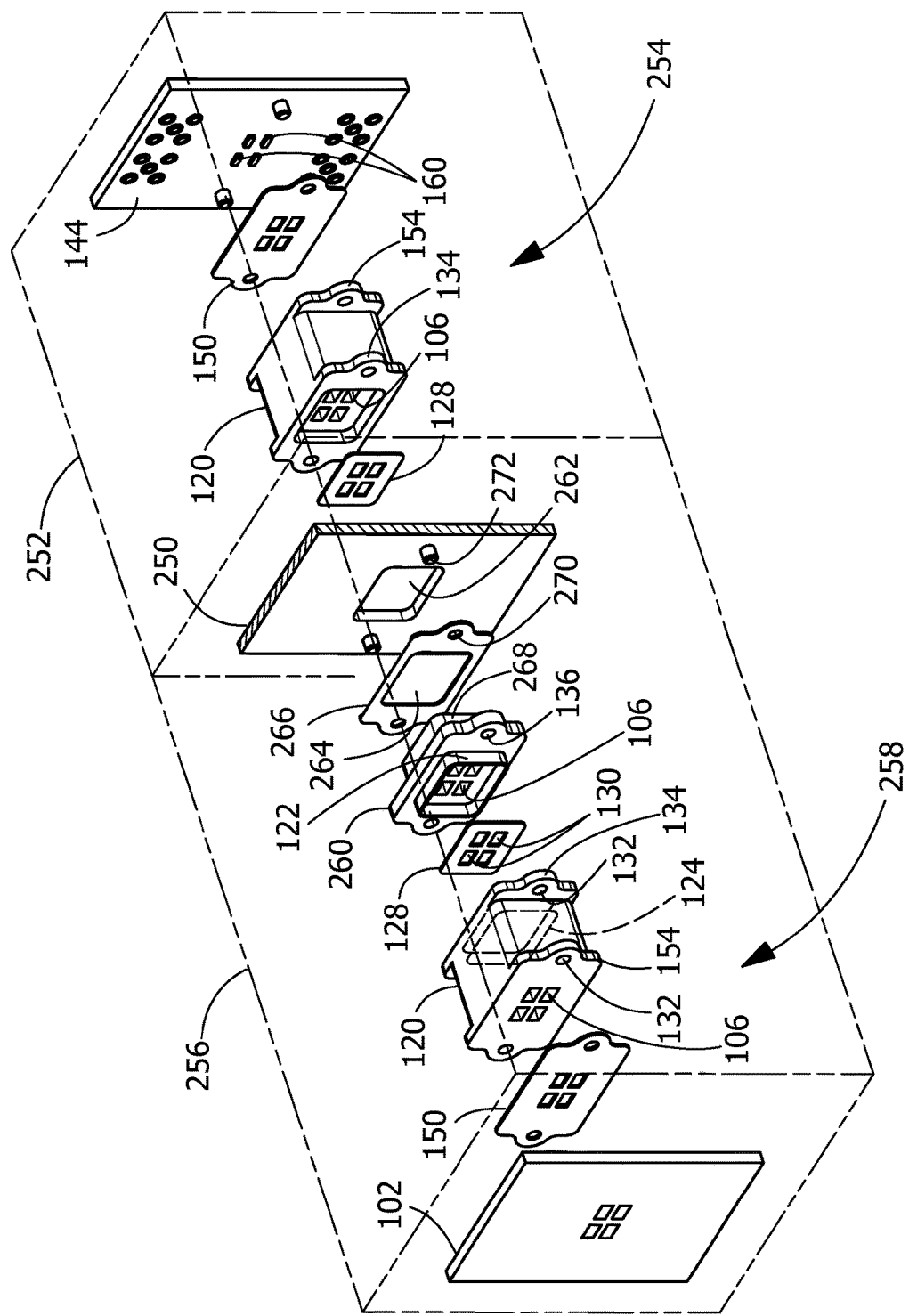
FIG. 9 is an exploded isometric view of an alternate embodiment board to board contactless interconnect through a sealed boundary.

FIG. 9 is an exploded isometric view of an alternate embodiment board to board contactless interconnect system capable of passing signals through a sealed boundary 250. In some embodiments, the board to board contactless interconnect system has waveguide portions 120 with straight cavities to accommodate first and second circuit boards 102 and 144 being parallel. As numbered features in FIG. 9 perform the same function as the numbered features in FIGS. 1, 8 and 9, the description of the numbered features are incorporated by reference.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A board to board contactless interconnect system, comprising:
    a first circuit board having a transceiver for launching or receiving a microwave signal into or from a first waveguide cavity extending through a first portion of a waveguide, the first portion of the waveguide having a first end and a second end, the first end securable to the first circuit board with the transceiver aligned with the first waveguide cavity;
    a first conductive gasket positioned between the first circuit board and the first end of the first portion of the waveguide, the first conductive gasket having an aperture aligned with the first waveguide cavity, the aperture having a cross-sectional shape and dimensions of a cross-section of the first waveguide cavity;
    a second portion of the waveguide having a first end and a second end, the first end of the second portion of the waveguide coupleable to the second end of the first portion of the waveguide, the second portion of the waveguide having a second waveguide cavity with the same cross-sectional shape and dimensions of the cross-section of the first waveguide cavity for receiving or passing the microwave signal;
    a second conductive gasket positioned between the second end of the first portion of the waveguide and the first end of the second portion of the waveguide, the second conductive gasket having an aperture of the second conductive gasket aligned with the first waveguide cavity and the second waveguide cavity, the aperture having the cross-sectional shape and dimensions of the cross-section of the second waveguide cavity;
    a second circuit board having a transceiver for receiving or launching the microwave signal from or into the second waveguide cavity, the second circuit board is oriented orthogonal to the first circuit board, the second end of the second portion of the waveguide securable to the second circuit board with the transceiver of the second circuit board aligned with the second waveguide cavity; and
    a third conductive gasket positioned between the second end of the second portion of the waveguide and the second circuit board, the third conductive gasket having an aperture of the third conductive gasket aligned with the second waveguide cavity, the aperture having the cross-sectional shape and dimensions of the cross-section of the second waveguide cavity.

2. A board to board contactless interconnect system as recited in claim 1, wherein a cross section of the first cavity of the first portion of the waveguide and the second cavity in the second portion of the waveguide is selected from the group consisting of circular, rectangular, and double ridge.

3. A board to board contactless interconnect system as recited in claim 2, wherein the microwave signal is transmitted from the transceiver of the first circuit board, the transceiver of the first circuit board selected from the group consisting of an integrated circuit and a board pad.

4. A board to board contactless interconnect system as recited in claim 2, wherein the microwave signal is received on the transceiver of the first circuit board, the transceiver of the first circuit board selected from the group consisting of an integrated circuit and a board pad.

5. A board to board contactless interconnect system as recited in claim 1, further comprising the transceiver of the first circuit board comprising:
    a stripline-waveguide transition comprising a conductive transmission line arranged and disposed between first and second ground planes, the conductive transmission line being dielectrically isolated from first and second ground planes by dielectric;
    a conductive stripline antenna extending into an opening in the first ground plane, the antenna coupled to the conductive transmission line, the antenna being a radiating/receiving element antenna of a fixed length and width;

the first portion of the waveguide arranged and disposed aligned with the opening in the first ground plane;

wherein the radio frequency energy transitions between a TEM mode propagation in the transmission line and a TE mode propagation in the waveguide; and wherein the stripline-waveguide transition is a transmitter which transitions radio frequency energy between a TE mode propagation in the waveguide and a TEM mode propagation in the antenna and transmission line as a receiver.

6. A board to board contactless interconnect system as recited in claim 1, wherein the microwave signal is transmitted from the transceiver of the first circuit board, the transceiver of the first circuit board selected from the group consisting of an integrated circuit and a board pad.

7. A board to board contactless interconnect system as recited in claim 1, wherein the microwave signal is received on the transceiver of the first circuit board, the transceiver of the first circuit board selected from the group consisting of an integrated circuit and a board pad.

8. A board to board contactless interconnect system as recited in claim 1, wherein the first portion of the waveguide and the second portion of the waveguide are a 90° arc of a circle.

9. A board to board contactless interconnect system comprising:
a first circuit board having a transceiver for launching or receiving a microwave signal into or from a waveguide assembly, a first waveguide of the waveguide assembly having a first end and a second end, the first end securable to the first circuit board with the transceiver and the first waveguide having a first waveguide cavity;
a first conductive gasket positioned between the first circuit board and the first end of the first waveguide, the first conductive gasket having an aperture aligned with the first waveguide cavity, the aperture having a cross-sectional shape and dimensions of a cross-section of the first waveguide cavity;
a second waveguide of the waveguide assembly having a first end and a second end, the second waveguide having a second waveguide cavity with the same cross-sectional shape and dimensions of the cross-section of the first waveguide cavity for receiving or passing the microwave signal;
a second conductive gasket an aperture aligned with the first waveguide cavity, the aperture of the second conductive gasket having the cross-sectional shape and dimensions of the cross-section of the first waveguide cavity;
a second circuit board having a transceiver for receiving or launching the microwave signal from or into the second waveguide cavity, the second end of the second waveguide securable to the second circuit board with the transceiver of the second circuit board aligned with the second waveguide cavity;
a third conductive gasket positioned between the second end of the second waveguide and the second circuit board, the third conductive gasket having an aperture aligned with the second waveguide cavity, the aperture of the third conductive gasket having the cross-sectional shape and dimensions of the cross-section of the second waveguide cavity;
a third waveguide interposed between the first waveguide and the second waveguide, the third waveguide having a third waveguide cavity with the same cross-sectional shape and dimensions of the cross-section of the first waveguide cavity and the second waveguide cavity, the third waveguide cavity for receiving and passing the microwave signal between first and second ends of the third waveguide, the first end of the third waveguide couplable to the second end of the first waveguide with the second conductive gasket therebetween, the second end of the third waveguide securable to a first side of a sealed boundary barrier, the third waveguide having a flange passing through an aperture in the sealed boundary barrier, the second end of the third waveguide member couplable with the first end of the second waveguide with the third waveguide cavity and the second waveguide cavity aligned;
a fourth conductive gasket positioned between second end of the the third waveguide and the first side of the sealed boundary barrier, the fourth conductive gasket having an aperture therein, the fourth conductive gasket surrounding the aperture of the sealed boundary barrier through which the third waveguide flange passes to prevent microwave energy leakage therebetween; and
a fifth conductive gasket positioned between the second end of the third waveguide and the first end of the second waveguide, the fifth gasket having an aperture aligned with the third waveguide cavity and the second waveguide cavity, the aperture of the fifth conductive gasket having the cross-sectional shape and dimensions of the cross-section of the second waveguide cavity.

10. A board to board contactless interconnect system as recited in claim 9, wherein the first waveguide cavity and the third waveguide cavity are each straight cavities.

11. A board to board contactless interconnect system as recited in claim 9, wherein the first waveguide cavity and the third waveguide cavity are each arcuate cavities.

12. A board to board contactless interconnect system as recited in claim 9, wherein a respective cross-section of the cavity in at least one of the first waveguide, the second waveguide, and the third waveguide is selected from the group consisting of circular, rectangular, and double ridge.

* * * * *